US012753798B2

(12) United States Patent
Fugel et al.

(10) Patent No.: US 12,753,798 B2
(45) Date of Patent: Oct. 6, 2026

(54) AXIAL ROLLING BEARING UNIT WITH ROLLING BODIES, WHICH ARE ARRANGED BETWEEN ANNULAR AXIAL BEARING WASHERS, AND A FUNCTIONALLY INTEGRATED BEARING CAGE

(71) Applicant: Schaeffler Technologies AG & Co. KG, Herzogenaurach (DE)

(72) Inventors: Wolfgang Fugel, Nuremberg (DE); Frank Schoenstein, Baiersdorf (DE); Andreas Kirschner, Aurachtal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/686,619

(22) PCT Filed: Aug. 23, 2022

(86) PCT No.: PCT/DE2022/100633
§ 371 (c)(1),
(2) Date: Feb. 26, 2024

(87) PCT Pub. No.: WO2023/036369
PCT Pub. Date: Mar. 16, 2023

(65) Prior Publication Data

US 2024/0369099 A1 Nov. 7, 2024

(30) Foreign Application Priority Data

Sep. 9, 2021 (DE) ..................... 10 2021 123 371.2

(51) Int. Cl.
*F16C 19/30* (2006.01)
*F16C 33/46* (2006.01)
(Continued)

(52) U.S. Cl.
CPC ........ *F16C 19/305* (2013.01); *F16C 33/4605* (2013.01); *F16C 33/546* (2013.01); *F16C 33/6681* (2013.01)

(58) Field of Classification Search
CPC ..... F16C 19/30; F16C 19/305; F16C 33/4605
See application file for complete search history.

(56) References Cited

U.S. PATENT DOCUMENTS 4,696,083 A * 9/1987 Olschewski ............ C21D 9/40
29/DIG. 49
5,967,674 A 10/1999 Reubelt
(Continued)

FOREIGN PATENT DOCUMENTS

DE 19535085 A1 3/1997
DE 10313183 A1 2/2004
(Continued)

OTHER PUBLICATIONS

Source: Office action Corresponding to Chinese Patent Application No. 202280059801.8, dated Jun. 11, 2026.

*Primary Examiner* — James Pilkington

(57) ABSTRACT

An axial rolling bearing unit includes a first annular axial bearing washer, a second annular axial bearing washer, a bearing cage formed from a sheet metal material, and rolling elements arranged between the first annular axial bearing washer and the second annular axial bearing washer. The bearing cage includes an inner radial edge rim extending in an axial direction, and an outer radial edge rim extending in the axial direction. The rolling elements are radially guided by the inner radial edge rim and the outer radial edge rim. A one of the inner radial edge rim or the outer radial edge rim has a double-rim design with an end-side bend extending in a direction opposite to the axial direction, and the
(Continued)

end-side bend has a first distal end section that holds the first annular axial bearing washer in a form-fitting manner.

20 Claims, 2 Drawing Sheets

(51) Int. Cl.
*F16C 33/66* (2006.01)
*F16C 33/54* (2006.01)

(56) References Cited

U.S. PATENT DOCUMENTS

| | | | | |
|---|---|---|---|---|
| 8,166,657 | B2 * | 5/2012 | Oishi | F16C 19/30<br>29/898.063 |
| 9,933,010 | B2 * | 4/2018 | Brown | F16C 19/55 |
| 2007/0154122 | A1 | 7/2007 | Brown | |
| 2025/0137486 | A1 * | 5/2025 | Fugel | F16C 19/305 |

FOREIGN PATENT DOCUMENTS

| | | | |
|---|---|---|---|
| DE | 102018130947 | A1 | 6/2020 |
| EP | 2988013 | A | 2/2016 |
| FR | 1223324 | A | 6/1960 |
| FR | 1446492 | A | 7/1966 |
| JP | 116522 | A | 1/1999 |
| JP | 2002089550 | A | 3/2002 |
| JP | 2006022846 | A | 1/2006 |
| JP | 2009041753 | A | 2/2009 |
| JP | 2012172763 | A | 9/2012 |
| JP | 2014005919 | A | 1/2014 |
| JP | 2015031390 | A | 2/2015 |
| WO | 2021118879 | A1 | 6/2021 |

* cited by examiner

AXIAL ROLLING BEARING UNIT WITH ROLLING BODIES, WHICH ARE ARRANGED BETWEEN ANNULAR AXIAL BEARING WASHERS, AND A FUNCTIONALLY INTEGRATED BEARING CAGE

CROSS-REFERENCE TO RELATED APPLICATIONS

This application is the United States National Phase of PCT Appln. No. PCT/DE2022/100633 filed Aug. 23, 2022, which claims priority to German Application No. DE102021123371.2 filed Sep. 9, 2021, the entire disclosures of which are incorporated by reference herein.

TECHNICAL FIELD

The present disclosure relates to a rolling bearing unit with rolling elements which are arranged between two annular axial bearing washers and which are guided by means of a bearing cage formed from a sheet metal material.

The field of application of the present disclosure extends primarily to automotive applications in which, for example, a shaft provided with helically toothed gears is subjected to an axial force which is to be absorbed by a suitable axial bearing relative to a transmission housing or the like.

BACKGROUND

DE 103 13 183 A1 shows an axial rolling bearing unit of the type of interest here. In this disclosure, a collar is arranged on an outer peripheral edge of an axial bearing washer, which is extended by a flange. In a region composed of the collar and flange, a radially inwardly directed nose-like projection is formed, which engages radially behind the cage on the outer circumference. The other axial bearing washer is designed as an angled washer and engages behind the bearing cage on the inner circumference with an axial leg. This angular geometry of the axial bearing washers creates a self-retaining axial rolling bearing unit.

When mounting the bearing cage in the axial bearing washers, which are designed as angled washers, an unfavorable concentricity between the bearing cage and the axial bearing washer can occur, particularly in automated manufacturing. This can result in either bending of the bearing cage or shearing of the retaining lugs on the axial bearing washers. If not detected, this leads to a disturbed running behavior of the axial bearing and can even lead to failure of the entire bearing point. If the overlap between the axial bearing washer, which is designed as an angled washer, and the bearing cage is too small, the axial rolling bearing unit may even be dismantled as a result of vibration stress.

SUMMARY

The present disclosure includes the technical teaching that the bearing cage of an axial rolling bearing unit formed from a sheet metal material has an inner and outer radial edge rim extending in the axial direction in order to radially guide the rolling elements. At least one of the edge rims is provided with an end-side bend in the opposite direction so as have a double-rim design, and the distal end section thereof has a rim border holding the associated axial bearing washer in a form-fitting manner.

The self-retaining structural unit is implemented by means of a specially constructed bearing cage which comprises the at least one axial bearing washer instead of vice versa, as in the prior art. This also opens up the possibility of using identical parts with regard to the annular axial bearing washers, which have an identical design. It is therefore not necessary to provide two different axial bearing washers per axial rolling bearing unit; instead, a total of three different components, namely the rolling elements, the bearing cage and the axial washers that can be used on both sides, are sufficient to implement the axial rolling bearing unit according to the disclosure. This simplifies both the manufacture and storage of individual parts.

According to an example embodiment of the bearing cage, the edge rim of the bearing cage lying opposite the double rim also has a distal end section with a rim border surrounding the other axial bearing washer in order to create an overall self-retaining structural unit using the bearing cage as a holding means. Here, the inner and outer radial edge rim encloses or surrounds an associated axial bearing washer in each case. In this regard, this enclosure or surround can be designed in such a way that the respective axial bearing washer is arranged with a radial movement clearance relative to the bearing cage that prevents component stresses. During assembly, this constructive design allows the individual parts to first be consolidated without incurring damage and then pressed together in the next step so that the rim borders fold over to form the structural unit. Since the structural unit according to the disclosure is largely closed all around by folding over the rim borders, unintentional dismantling can be ruled out.

In order to facilitate bending, the distal end sections of the edge rims may be wall-ironed by means of forming technology. This constriction of the edge rim creates a predetermined bending point, for example, because the edge rim is already pre-bent accordingly when the bearing cage produced by means of forming technology is deep-drawn. In this way, the material-weakening wall-ironing effect that is normally disadvantageous in deep drawing is used in an advantageous manner to create the predetermined bending point for the rim border.

In this context, the wall-ironed distal end section of the edge rim may be designed in such a way that an approximate form-fit results after the rim border is folded over onto the associated axial washer. This can be achieved by the axial bearing washers each being provided with an inner and outer radial edge shoulder which interacts with the respectively associated wall-ironed distal end section of the edge rim in such a way that the rim border bent over to form the enclosure does not project significantly beyond the outer side surface of the axial bearing washer, for example, resulting in a flat outer side surface. The inner and outer radial edge shoulder of the axial bearing washer may be produced by means of embossing. The annular axial bearing washers can therefore be produced from sheet metal material as stamped and embossed parts that are easy to manufacture. Although only one of the edge shoulders each of the axial bearing washers interacts with the bent-over rim border in the assembled state, the other edge shoulder can remain free without impairing the functionality of the axial rolling bearing unit. This compromise is made in favor of the above-mentioned identical part design of the axial bearing washers.

According to an alternative embodiment, the edge rim of the bearing cage surrounding the axial bearing washer can also be formed only in sections on part of the circumference. This means that the rim border does not have to be bent along the entire circumference during assembly, but only partially, which can be achieved with an appropriately designed bending die. This reduces the pressing forces required for assembly.

According to a further measure, it is proposed that a transition shoulder facing the respective axial bearing washer between the edge rim and the edge region of the bearing cage adjoining it and wall-ironed in relation to it forms a predetermined bending point for the enclosure of the axial bearing point. In other words, the wall-ironed edge region of thinner material is connected to the edge rim via the transition shoulder, which enables a closed right-angled outer geometry due to this alignment.

According to another aspect of the disclosure, it is proposed that the bearing cage formed from a sheet metal material has bearing webs which are spaced apart from one another in the circumferential direction and which serve to enclose the rolling elements and are each designed in the form of a sigma profile, so that the two inner and outer radial axially directed edge rims extend from one of the two axial bearing washers towards the other axial bearing washer. The generally known sigma profile originates on an axial side of the bearing cage with initially short radial sections facing one another, which are followed by inclined flank sections facing one another and culminating in a radially extending peak section, which in profile resembles the capital Greek letter sigma. A bearing cage formed in accordance with the disclosure can thus be used to implement such a sigma profile for shaping the bearing webs in order to enable precise guidance of the rolling elements on the one hand and to form the functionally integrated edge rims on the other, which, in addition to the radial guidance of the rolling elements, also form an enclosure for the axial bearing washers.

According to a further measure, it is proposed that the outer radial edge rim of the bearing cage is provided with lubricant breakthroughs arranged spaced apart from one another in the circumferential direction. The lubricant breakthroughs may be made in a circular shape by means of stamping and enable optimal lubrication of the rolling elements inside the bearing in order to minimize wear.

BRIEF DESCRIPTION OF THE DRAWINGS

The disclosure is described in more detail below together with the description of two exemplary embodiments with reference to the figures. In the figures.

DETAILED DESCRIPTION

Figure 1:
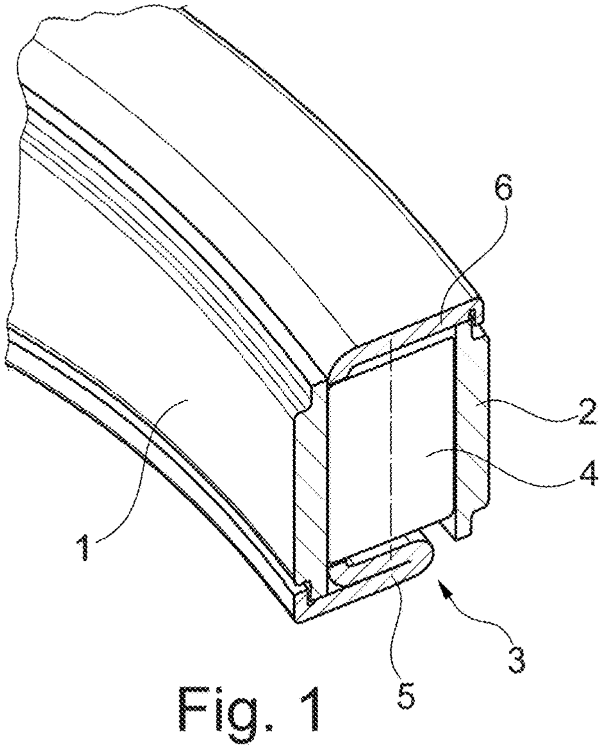
FIG. 1 shows a perspective partial section through an axial rolling bearing unit in the assembled state.

According to FIG. 1, the axial rolling bearing unit includes rolling elements 4 arranged between two opposing annular axial bearing washers 1 and 2, which are designed here as needles or roller bodies. The rolling elements 4 are guided by means of a bearing cage 3 formed from a sheet metal material. The bearing cage 3 has an inner radial and outer radial edge rim 5 or 6 extending in the axial direction in order to radially guide the rolling elements 4.

Figure 2:
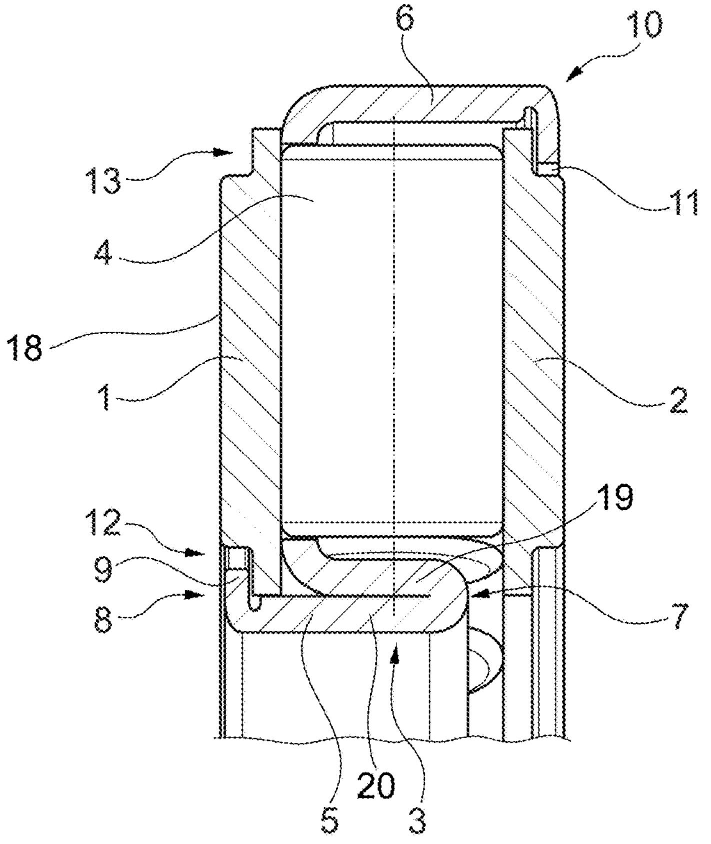
FIG. 2 shows a longitudinal section through the axial rolling bearing unit according to FIG. 1 in the assembled state.

According to FIG. 2, the edge rim 5 is designed as a double rim provided with an end-side bend 7 in the opposite direction. The end-side bend 7 adjoins a first bend portion 19 and a second bend portion 20 that is folded over the first bend portion 19. A distal end section 8 of the second bend portion 20 of the edge rim 5 has rim border 9 that surrounds the associated axial bearing washer 1. The distal end section 8 extends beyond the first bend portion 19 in an axial direction.

In order to create a self-retaining structural unit using the bearing cage 3 as a holding means, the edge rim 6 of the bearing cage 3 lying opposite the double rim also has a distal end section 10 with a rim border 11 surrounding the other axial bearing washer 2.

The axial bearing washers 1 and 2 each have an (exemplary) inner and outer radial edge shoulder 12 or 13 which interacts with the respectively associated wall-ironed distal end section 8 or 10 of the respectively associated edge rim 5 or 6. The rim border 9 or 11, which is bent over to form the enclosure or surround, does not project beyond the outer side surface 18 of the respective axial bearing washer 1 or 2 in order to create a flat, end-face outer surface.

Figure 3:
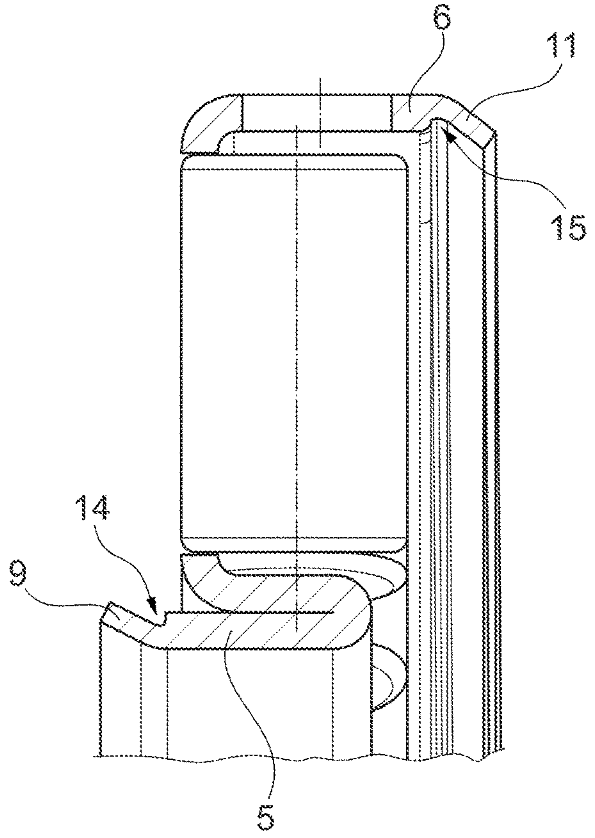
FIG. 3 shows a longitudinal section through an axial rolling bearing unit of another embodiment in a partially assembled state.

According to FIG. 3, a transition shoulder 14 or 15 facing the respective axial bearing washer—not shown further here—between the edge rim 5 or 6 and the edge region 9 or 11 adjoining it and wall-ironed in relation to it forms a predetermined bending point for the enclosure of the associated axial bearing washer.

Figure 4:
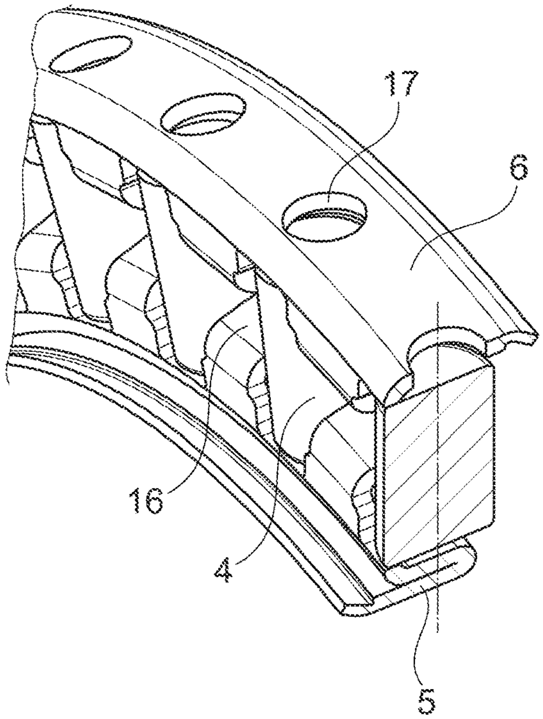
FIG. 4 shows a perspective longitudinal section through the partially assembled rolling bearing unit according to FIG. 3.

According to FIG. 4, the bearing cage 3 formed from a sheet metal material has (exemplary) bearing webs 16 spaced apart from one another in the circumferential direction, which serve to enclose the rolling elements 4 to be guided spaced apart from one another and are each designed in the form of a sigma profile. This shape is the prerequisite for the two inner and outer radial axially directed edge rims 5 and 6 to extend from one of the two axial bearing washers towards the other axial bearing washer, as can be seen in the sectional view in FIG. 2.

Furthermore, the outer radial edge rim 6 of the bearing cage 3 is provided with several circular lubricant breakthroughs 17, which can be seen most clearly from this figure and are arranged spaced apart from one another in the circumferential direction, which are produced here by means of stamping.

REFERENCE NUMERALS

1 First axial bearing washer
2 Second axial bearing washer
3 Bearing cage
4 Rolling elements
5 Inner radial edge rim
6 Outer radial edge rim
7 Bend
8 First distal end section
9 First rim border
10 Second distal end section
11 Second rim border
12 Inner radial edge shoulder
13 Outer radial edge shoulder
14 First transition shoulder
15 Second transition shoulder
16 Bearing web
17 Lubricant breakthrough
18 Outer side surface

19 First bend portion
20 Second bend portion

The invention claimed is:

1. An axial rolling bearing unit, comprising:
a bearing cage;
two annular axial bearing washers comprising a first axial bearing washer and a second axial bearing washer; and
rolling elements arranged between the two annular axial bearing washers and guided by the bearing cage formed from a sheet metal material, the bearing cage having an inner radial edge rim and an outer radial edge rim, the edge rims extending axially to radially guide the rolling elements,
wherein a first one of the edge rims includes an end-side bend, the end-side bend adjoining a first bend portion and a second bend portion folded over the first bend portion to define a double-rim configuration,
wherein a rim border is formed on a distal end section of the double-rim configuration, the rim border at least partially surrounding the first axial bearing washer to provide a form-fitting holding means for the first axial bearing washer.

2. The axial rolling bearing unit according to claim 1, wherein the distal end section of the double-rim configuration on which the rim border is formed has a reduced wall thickness relative to an adjoining portion of the first one of the edge rims to facilitate bending at the distal end section.

3. The axial rolling bearing unit according to claim 2, wherein the distal end section having the reduced wall thickness interacts with a shoulder of the first axial bearing washer such that the rim border of the distal end section having the reduced wall thickness is bent over to form an enclosure and does not project beyond an outer side surface of the first axial bearing washer.

4. The axial rolling bearing unit according to claim 2, wherein a transition shoulder, formed on the second bend portion and adjacent to the rim border, is located at the distal end section having the reduced wall thickness and defines a predetermined bending point for enclosure of the first axial bearing washer.

5. The axial rolling bearing unit according to claim 1, wherein the rim border of the bearing cage surrounding the first axial bearing washer is formed in sections on part of the circumference.

6. The axial rolling bearing unit according to claim 1, wherein the two annular axial bearing washers are identical parts.

7. The axial rolling bearing unit according to claim 1, wherein the bearing cage has bearing webs which are spaced apart from one another in the circumferential direction and which serve to enclose the rolling elements and extend from one of the two annular axial bearing washers towards a remaining one of the two annular axial bearing washers.

8. The axial rolling bearing unit according to claim 1, wherein the outer radial edge rim of the bearing cage is provided with lubricant breakthroughs arranged spaced apart from one another in the circumferential direction.

9. The axial rolling bearing unit according to claim 1, wherein the two annular axial bearing washers are produced from sheet metal material as stamped and embossed parts.

10. The axial rolling bearing unit of claim 1, wherein the first bend portion extends in a first axial direction, and the second bend portion extends in a second axial direction, opposite the first axial direction, and the first bend portion is arranged radially inwardly of the second bend portion.

11. The axial rolling bearing unit of claim 10, wherein the second bend portion and the rim border of the double-rim configuration extend beyond the first bend portion in an axial direction.

12. The axial rolling bearing unit of claim 1, wherein the distal end section is arranged on the second bend portion.

13. The axial rolling bearing unit of claim 1, wherein the rim border is positioned opposite to the end-side bend in an axial direction such that the rim border and the end-side bend are disposed on opposite axial sides of the double-rim configuration.

14. The axial rolling bearing unit of claim 1, wherein the first axial bearing washer further comprises a radial edge shoulder that interacts with the rim border to form a flat, end-face outer surface.

15. An axial rolling bearing unit comprising:
a first annular axial bearing washer;
a second annular axial bearing washer;
a bearing cage formed from a sheet metal material, the bearing cage comprising:
an inner radial edge rim extending in an axial direction; and
an outer radial edge rim extending in the axial direction; and
rolling elements arranged between the first annular axial bearing washer and the second annular axial bearing washer, the rolling elements being radially guided by the inner radial edge rim and the outer radial edge rim, wherein:
at least one of the edge rims comprises an end-side bend, the end-side bend adjoining a first bend portion and a second bend portion folded over the first bend portion to define a double-rim configuration;
the first bend portion extends in a first axial direction toward the first annular axial bearing washer, and the second bend portion extends in a second axial direction, opposite the first axial direction, toward the second annular axial bearing washer; and
a first distal end section of the second bend portion forms a first rim border that holds the second annular axial bearing washer in a form-fitting manner.

16. The axial rolling bearing unit of claim 15 wherein:
another one of the edge rims extends from the second annular axial bearing washer towards the first annular axial bearing washer and comprises a second distal end section with a second rim border surrounding the first annular axial bearing washer to hold the first annular axial bearing washer in a form-fitting manner.

17. The axial rolling bearing unit of claim 16 wherein:
the first annular axial bearing washer comprises a first radial edge shoulder that interacts with the second distal end section such that the second rim border does not project beyond a first outer side surface of the first annular axial bearing washer; and
the second annular axial bearing washer comprises a second radial edge shoulder that interacts with the first distal end section such that the first rim border does not project beyond a second outer side surface of the second annular axial bearing washer.

18. The axial rolling bearing unit of claim 16, wherein:
the first rim border is formed of partial circumferential sections; or
the second rim border is formed from partial circumferential sections.

19. The axial rolling bearing unit of claim 16, wherein:
the first distal end section is wall-ironed and a first transition shoulder facing the second annular axial bearing washer, the first transition shoulder adjoining the first rim border, forms a first predetermined bending point for enclosing the second annular axial bearing washer; or the second distal end section is wall-ironed and a second transition shoulder facing the first annular axial bearing washer, the second transition shoulder adjoining the second rim border, forms a second predetermined bending point for enclosing the first annular axial bearing washer.

20. The axial rolling bearing unit of claim 16, wherein the first bend portion extends from the second annular axial bearing washer towards the first annular axial bearing washer in the first axial direction.

* * * * *